United States Patent
Crabtree et al.

(10) Patent No.: US 7,559,370 B2
(45) Date of Patent: Jul. 14, 2009

(54) RESTRICTING FLUID PASSAGE AND NOVEL MATERIALS THEREFOR

(75) Inventors: Michael John Crabtree, Whitley Bay (GB); Nicholas John Crowther, Bradford (GB); Donald Eagland, Huddersfield (GB); Philip Fletcher, Hardwick (GB)

(73) Assignee: Oilflow Solutions Holdings Limited, Bradford (GB)

( * ) Notice: Subject to any disclaimer, the term of this patent is extended or adjusted under 35 U.S.C. 154(b) by 435 days.

(21) Appl. No.: 10/549,634

(22) PCT Filed: Mar. 17, 2004

(86) PCT No.: PCT/GB2004/001126

§ 371 (c)(1),
(2), (4) Date: Nov. 29, 2005

(87) PCT Pub. No.: WO2004/083589

PCT Pub. Date: Sep. 30, 2004

(65) Prior Publication Data

US 2006/0102351 A1    May 18, 2006

(30) Foreign Application Priority Data

Mar. 20, 2003   (GB) ................... 0306333.6

(51) Int. Cl.
*E21B 33/138* (2006.01)
(52) U.S. Cl. .................. 166/295; 166/300; 523/130
(58) Field of Classification Search ................ 166/295, 166/300; 523/130
See application file for complete search history.

(56) References Cited

U.S. PATENT DOCUMENTS 4,939,203 A * 7/1990 Marrocco ................ 524/557
5,335,733 A   8/1994 Sandiford et al.
6,103,772 A   8/2000 Sydansk

FOREIGN PATENT DOCUMENTS

EP   0 577 010 A   1/1994

* cited by examiner

*Primary Examiner*—William P Neuder
(74) *Attorney, Agent, or Firm*—Rothwell, Figg, Ernst & Manbeck, P.C.

(57) ABSTRACT

Water problems in the production of oil or gas from subterranean formations is addressed by providing a method of restricting passage of a fluid from a first location to a second location in a subterranean formation by injecting into the formation a formulation comprising a first material, for example a dialdehyde, arranged to cross-link a second polymeric material, for example a polyvinyl alcohol, thereby to form a polymeric material of high viscosity which may block the passage between the first and second locations.

33 Claims, No Drawings

RESTRICTING FLUID PASSAGE AND NOVEL MATERIALS THEREFOR

CROSS REFERENCE TO RELATED APPLICATION

This application is a 35 USC §371 National Phase Entry Application from PCT/GB2004/001126, filed Mar 17, 2004, and designating the United States.

This invention relates to the restriction of fluid passage and novel materials therefor. Particularly, although not exclusively, the invention relates to a method of reducing the production of water from a water and oil or gas producing subterranean formation.

Fluid communication in the near well bore between a hydrocarbon production interval or a drive fluid injection interval and an underlying aquifer can diminish hydrocarbon recovery from the associated hydrocarbon-bearing formation. Fluid communication can occur either across permeable matrix separating the interval from the aquifer or via one or more vertical fractures or a fracture network connecting the interval and the aquifer.

Common water problems in oil and gas fields include: flow behind casing; casing, tubing or packer leaks; a watered out layer with or without cross-flow; moving oil-water contact; fractures or faults from a water layer (vertical well); fractures or faults between an injector and a producer; poor areal sweep; a gravity segregated layer; and coning or cusping. To illustrate water problems, coning is described further below.

When hydrocarbons are produced from a formation across a near well bore production interval into the well bore penetrating the formation, water from an underlying aquifer tends to migrate upwards into the production interval if there is fluid communication between the interval and the aquifer. Migration of water into the production interval is termed water coning. There are two negative consequences of water coning. The first is that water residing in the production interval can block or significantly diminish the flow of hydrocarbons from the outlying formation into the well bore. The second consequence is that water production can compete with and diminish hydrocarbon production. As a result, the ratio of water to hydrocarbons produced from the well bore can become unacceptably high when water coning occurs.

Water coning is extremely difficult to remedy whether fluid communication between the interval and aquifer is across vertical fractures or matrix. A traditional method of treating water coning is to cement the well bore over the lower portion of the production interval. Unfortunately, well bore cementing at best only slightly reduces water coning and subsequent water production. Water coning usually recurs at the uncemented upper portion of the production interval shortly after the cement treatment, negating the effectiveness of the treatment.

Another means of treating water coning is to inject gels into the fractures or matrix providing fluid communication with the production interval. A gel treatment can block migration of aquifer water into the production interval but known treatments may also unacceptably damage the production interval because of the presence of gel in the interval. Known gels may be selectively placed in a process referred to as "mechanical zonal isolation" but disadvantageously such known gels tend to migrate into the production interval and, in any event, mechanical zone isolation can be costly to put in place.

Water coning may be caused by poor vertical and areal conformance in a hydrocarbon-bearing formation. "Vertical conformance" is a measure of the degree of geologic uniformity in permeability on moving across a hydrocarbon-bearing formation. "Areal conformance" is a measure of the degree of geologic uniformity in permeability on moving horizontally across the formation.

Poor vertical conformance results from the vertical juxtaposition of relatively high permeability geologic zones to relatively low permeability zones within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean wellbore across which fluids are injected or produced.

It is an object of the present invention to address the above described problems and other problems associated with restricting fluid passage.

According to a first aspect of the invention, there is provided a method of restricting passage of a fluid from a first location to a second location, the method comprising:

(a) selecting a first material;

(b) selecting a second polymeric material which includes a functional group which is able to react in the presence of said first material to form a third polymeric material;

(c) causing the formation of said third polymeric material by a reaction involving said first material and said second polymeric material; and (d) arranging said third polymeric material between said first and second locations.

According to a second aspect of the invention, there is provided a method of restricting passage of a fluid from a first location to a second location, the method comprising positioning a polymeric material (herein "said third polymeric material") between said first and second locations, wherein said third polymeric material is a product of a reaction involving:

(a) a first material; and (b) a second polymeric material which includes a functional group which is able to react in the presence of said first material to form said third polymeric material.

Whilst the methods of the first and second aspects may be used in any situation wherein it is desired to restrict the passage of a fluid between first and second locations, the methods preferably comprise restricting the passage of a fluid, for example water (e.g. sea water) between two subterranean locations. Thus, there may be provided a method of reducing the production of water from a water and oil (and/or gas) producing subterranean formation which comprises contacting the formation with:

(a) a restrictor formulation which comprises a first material and a second polymeric material as described above; and/or (b) a third polymeric material as described above.

The invention extends to a method of plugging at least one relatively high permeability region bounded by at least one relatively low permeability region in a hydrocarbon-bearing subterranean formation, said formation being penetrated by a well bore (which is preferably in fluid communication with said at least one relatively high permeability region), the method comprising contacting said formation (preferably at least one relatively high permeability region) with a restrictor formulation and/or a third polymeric material as described above.

The methods described above preferably include injecting a said restrictor formulation into a subterranean formation and causing it to move to a desired location in which it may restrict passage of fluid (e.g. water) from a first location to a second location (e.g. it may restrict passage of water through a relatively high permeability region of the formation). In said desired location the viscosity of the restrictor formulation preferably increases (compared to its viscosity when injected into the formation) as it gels and forms said third polymeric material. The viscosity of the restrictor formulation immediately prior to injection into said subterranean formation may be less than 100 cP, is suitably less than 50 cP, is preferably less than 20 cP, more preferably less than 10 cP, especially less than 8 cP. For the avoidance of doubt, the restrictor formulation is suitably present at the outlet end of an injection means immediately prior to injection and said injection means is within the subterranean formation. A relatively low viscosity enables the restrictor formulation to flow relatively easily through injection apparatus and into the formation. The viscosity of the restrictor formulation preferably increases over time until it forms a gel in said desired location. Suitably, the formulation is such that it takes over 1 hour, preferably over 2 hours, more preferably over 3 hours, (measured from its preparation) at 25° C. to form a solid gel (the viscosity of which remains substantially unchanged over time). This allows operators time to inject the restrictor formulation and cause it to move to a desired location before its viscosity is too high. Advantageously, said restrictor formulation which is injected is inherently capable of gelling and the method suitably does not require the restrictor formulation to contact another reactant (either injected into the subterranean formation separately or already present therein) to enable it to gel. Preferably, when the gel has been formed in said desired location it is substantially immovably arranged therein so that it may set as a plug for a reasonable period of time such that it may improve water control or conformance and/or reduce water coning.

Prior to introduction into the subterranean formation, for example when above ground, said restrictor formulation may have a viscosity of less than 150 cP, more preferably less than 100 cP.

Said restrictor formulation preferably has a density at 25° C. which is less than the density of pure water and preferably less than the density of sea water. Said restrictor formulation preferably has a density at 25° C. of less than 1.0 gcm$^{-3}$. Advantageously, in view of its density, the restrictor formulation may tend to migrate to a water-oil interface which may facilitate relatively accurate positioning of the restrictor formulation and, therefore, improve its effectiveness.

The ratio of the wt % of said first material to the wt % of said second polymeric material in said restrictor formulation is suitably less than 0.15, preferably less than 0.12, more preferably 0.1 or less. Said ratio may be at least 0.02, preferably at least 0.04, more preferably at least 0.06, especially at least 0.07.

The sum of the wt % of the first material and said second polymeric material in said restrictor formulation may be at least 2 wt %, preferably at least 3 wt %, more preferably at least 4 wt %. The sum may be less than 15 wt %, preferably less than 10 wt %, more preferably less than 8 wt %, especially less than 6 wt %.

Suitably, the amounts of "first material" and "second polymeric material" described refer to the sum of the amounts of first materials (if more than one type is provided) and the sum of the amounts of second polymeric materials (if more than one type is provided).

Said restrictor formulation preferably includes water. In general terms water for use as described herein may be derived from any convenient source. It may be potable water, surface water, sea water, aquifer water, deionised production water and filtered water derived from any of the aforementioned sources. The water may be treated so that it is suitable for use in the method. For example, it may be treated by addition of oxygen scavengers, biocides, corrosion inhibitors, scale inhibitors, anti-foaming agents and flow improvers. Sea water and/or water from other sources may be deoxygenated and/or desulphonated. Said restrictor formulation may include at least 40 wt %, preferably at least 60 wt %, more preferably at least 70 wt %, especially at least 85 wt % water. The amount of water is preferably less than 90 wt %.

Said restrictor formulation preferably further includes an additional component. Said additional component is preferably substantially immiscible with pure water at 25° C. It is preferably organic. It is preferably non-polar. It is preferably less dense than water at 25° C. It may have a boiling point of greater than 110° C. It may be a hydrocarbon or an oil. Preferred hydrocarbons include alkanes, preferably mixtures thereof such as diesel oil and kerosene. A said oil may be a vegetable oil. Said additional component is preferably provided as an emulsion in said restrictor formulation.

Said restrictor formulation may include 50 wt % or less, preferably 40 wt % or less, more preferably 30 wt % or less, especially 20 wt % or less of said additional component. Said restrictor formulation may include 0 to 20 wt %, preferably 1 to 20 wt %, more preferably 2 to 15 wt %, especially 4 to 10 wt % of said additional component, especially an alkane containing material, such as diesel oil.

Said restrictor formulation preferably includes a catalyst for catalysing the reaction of the first material and said second polymeric material. Said catalyst is preferably a protic acid. Said acid preferably has an acid dissociation constant value of greater than $10^{-6}$, more preferably greater than $10^{-4}$ and, especially, greater than $10^{-2}$. Said restrictor formulation suitably includes less than 5 wt %, preferably less than 2 wt %, more preferably less than 1 wt %, especially less than 0.5 wt % of catalyst.

The pH of the restrictor formulation, suitably measured immediately prior to it being injected into a subterranean formation, is suitably less than 6, preferably less than 4, more preferably less than 2. The pH is suitably greater than 1. The aforementioned protic acid included as a catalyst may be used to adjust the pH to the desired level.

Preferably, in the method, said restrictor formulation suitably comprising said first material, said second polymeric material and, optionally, said additional component (e.g. diesel oil) and a said catalyst, is prepared at the surface and then injected into the subterranean formation. Said formulation may be prepared by mixing said first material and said second polymeric material together in water. Then, the additional component may be added and emulsified. Finally, the catalyst may be added to the formulation.

Preferably, formation of said third polymeric material from said second polymeric material and first material involves a reaction (for example) a condensation reaction, wherein covalent bonds are formed. Preferably, formation of said third polymeric material involves an acid catalysed reaction. Preferably, said second polymeric material and first material include functional groups which are arranged to react, for example to undergo a condensation reaction, thereby to form said third polymeric material. Preferably, said second polymeric material and first material include functional groups which are arranged to react for example to undergo an acid catalysed reaction thereby to form said third polymeric material.

Said first material may be an aldehyde, carboxylic acid, urea, acroleine, isocyanate, vinyl sulphate or vinyl chloride of a diacid or include any functional group capable of reacting, for example condensing, with one or more groups on said second polymeric material. Examples of the aforementioned include formaldehyde, acetaldehyde, glyoxal and glutaraldehyde, as well as maleic acid, oxalic acid, dimethylurea, polyacroleines, diisocyanates, divinyl sulphate and the chlorides of diacids.

Said first material is preferably an aldehyde containing or generating compound. Preferably, said first material is an aldehyde containing compound.

Said first material may include one or more aldehyde groups. Whilst it could be a monoaldehyde such as formaldehyde it preferably includes a plurality of aldehyde groups.

Said first material BB may have a general formula

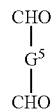

where $G^5$ represents a direct link or a linking moiety.

$G^5$ may be arranged to space apart the —CHO groups thereby to affect the spacing of the cross-linking of the second polymeric material.

In one embodiment, group $G^5$ may be a —(CH$_2$)$_y$— moiety wherein y represents 0 to 8, and one or more of the H atoms may be replaced by (but preferably are not replaced by) another atom or group. Preferably, y represents 0 to 6, more preferably 0 to 4, especially 0 to 2.

Group $G^5$ may be arranged to introduce some rigidity into the cross-linking of the second polymeric material. For example, group $G^5$ may include at least some covalent bonds which are not freely rotatable. For example, group $G^5$ preferably does not consist exclusively of a —CH$_2$— chain wherein each carbon-carbon bond will be freely rotatable but preferably includes an atom or group or other means which restricts free rotation compared to a case wherein $G^5$ consists of a —CH$_2$— chain. For example $G^5$ may incorporate bulky atoms or groups; and/or unsaturated atoms or groups; and/or atoms or groups which hinder free rotation due to electronic effects.

Group $G^5$ may include at least 1, preferably at least 2, more preferably at least 3, especially at least 4, carbon atoms in a chain extending between the two —CHO groups.

In one embodiment, group $G^5$ incorporates one or more aromatic or heteroaromatic groups. Such groups may be arranged to restrict rotation as described. Preferred heteroaromatic groups include N-containing heteroaromatic groups. Preferred aromatic and heteroaromatic groups are selected from optionally-substituted phenyl and N-containing aromatic groups, such as pyridinyl groups.

Group $G^5$ preferably includes both an aromatic and N-containing heteroaromatic group.

Group $G^5$ preferably includes some charge separation. It preferably includes a polar group. It preferably includes a cationic group. A preferred cationic group is one which includes a $N^+$ moiety.

Group $G^5$ may itself include one or more aldehyde (or other) functional groups.

Said third polymeric material may include a moiety

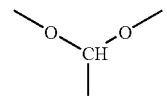

wherein the free bonds of the oxygen atoms are bonded to a polymeric backbone and the free bond of the carbon atom is bonded to a residue of said first material. The residue of said first material may also be bonded to the polymeric backbone of another polymeric chain (for example of a said second polymeric material as described), thereby to cross-link said second polymeric material.

Said first material may comprise:

(i) a first polymeric material having a repeat unit of formula

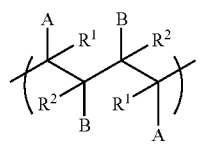

wherein A and B are the same or different, are selected from optionally-substituted aromatic and heteroaromatic groups and at least one comprises a relatively polar atom or group and $R^1$ and $R^2$ independently comprise relatively non-polar atoms or groups; or (ii) a first polymeric material prepared or preparable by providing a compound of general formula

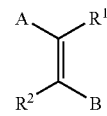

wherein A, B, $R^1$ and $R^2$ are as described above, in an aqueous solvent and causing the groups C=C in said compound to react with one another to form said first polymeric material.

In the first polymeric material described above, A and/or B could be multi-cyclic aromatic or heteroaromatic groups. Preferably, A and B are independently selected from optionally-substituted five or more preferably six-membered aromatic and heteroaromatic groups. Preferred heteroatoms of said heteroaromatic groups include nitrogen, oxygen and sulphur atoms of which oxygen and especially nitrogen, are preferred. Preferred heteroaromatic groups include only one heteroatom. Preferably, a or said heteroatom is positioned furthest away from the position of attachment of the heteroaromatic group to the polymer backbone. For example, where the heteroaromatic group comprises a six-membered ring, the heteroatom is preferably provided at the 4-position relative to the position of the bond of the ring with the polymeric backbone.

Preferably, A and B represent different groups. Preferably, one of A or B represents an optionally-substituted aromatic group and the other one represents an optionally-substituted heteroaromatic group. Preferably A represents an optionally-substituted aromatic group and B represents an optionally-substituted heteroaromatic group especially one including a nitrogen heteroatom such as a pyridinyl group.

Unless otherwise stated, optionally-substituted groups described herein, for example groups A and B, may be substituted by halogen atoms, and optionally substituted alkyl, acyl, acetal, hemiacetal, acetalalkyloxy, hemiacetalalkyloxy, nitro, cyano, alkoxy, hydroxy, amino, alkylamino, sulphinyl, alkylsulphinyl, sulphonyl, alkylsulphonyl, sulphonate, amido, alkylamido, alkylcarbonyl, alkoxycarbonyl, halocarbonyl and haloalkyl groups. Preferably, up to 3, more preferably up to 1 optional substituents may be provided on an optionally substituted group.

Unless otherwise stated, an alkyl group may have up to 10, preferably up to 6, more preferably up to 4 carbon atoms, with methyl and ethyl groups being especially preferred.

Preferably, A and B each represent polar atoms or group that is, there is preferably some charge separation in groups A and B and/or groups A and B do not include carbon and hydrogen atoms only.

Preferably, at least one of A or B includes a functional group which can undergo a condensation reaction, for example on reaction with said second polymeric material. Preferably, A includes a said functional group which can undergo a condensation reaction.

Preferably, one of groups A and B includes an optional substituent which includes a carbonyl or acetal group with a formyl group being especially preferred. The other one of groups A and B may include an optional substituent which is an alkyl group, with an optionally substituted, preferably unsubstituted, $C_{1-4}$ alkyl group, for example a methyl group, being especially preferred.

Preferably, A represents a group, for example an aromatic group, especially a phenyl group, substituted (preferably at the 4-position relative to polymeric backbone when A represents an optionally-substituted phenyl group) by a formyl group or a group of general formula

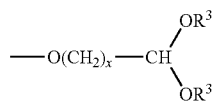

II where x is an integer from 1 to 6 and each $R^3$ is independently an alkyl or phenyl group or together form an alkalene group.

Preferably, B represents an optionally-substituted heteroaromatic group, especially a nitrogen-containing heteroaromatic group, substituted on the heteroatom with a hydrogen atom or an alkyl or aralkyl group. More preferably, B represents a group of general formula

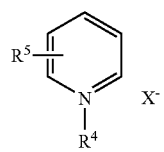

III wherein $R^4$ represents a hydrogen atom or an alkyl or aralkyl group, $R^5$ represents a hydrogen atom or an alkyl group and $X^-$ represents a strongly acidic ion.

Preferably, $R^1$ and $R^2$ are independently selected from a hydrogen atom or an optionally-substituted, preferably unsubstituted, alkyl group. Preferably, $R^1$ and $R^2$ represent the same atom or group. Preferably, $R^1$ and $R^2$ represent a hydrogen atom.

Preferred first polymeric materials may be prepared from any of the compounds described on page 3 line 8 to line 39 of GB2030575B by the method described in WO98/12239 and the contents of the aforementioned documents are incorporated herein by reference.

Said first polymeric material may be of formula

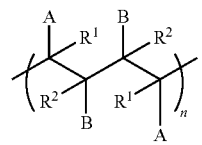

wherein A, B, $R^1$ and $R^2$ are as described above and n is an integer. Integer n is suitably 10 or less, preferably 8 or less, more preferably 6 or less, especially 5 or less. Integer n is suitably at least 1, preferably at least 2, more preferably at least 3.

Said third polymeric material suitably includes a moiety of formula

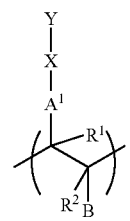

wherein $R^1$, $R^2$ and B are as described above, $A^1$ represents a residue of group A described above after the reaction involving said first and second polymeric materials, Y represents a residue of said second polymeric material after said reaction involving said first and second polymeric materials and X represents a linking atom or group extending between the residues of said first and second polymeric materials. In one preferred embodiment $A^1$ represents an optionally-substituted phenyl group, X represents a group

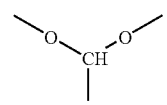

which is bonded via the oxygen atoms to a residue of said second polymeric material. For example, group X may be bonded to the polymeric backbone of said second polymeric material.

Preferably, said second polymeric material includes a functional group selected from an alcohol, carboxylic acid, carboxylic acid derivative, for example an ester, and an amine group. Said second polymeric material preferably includes a backbone comprising, preferably consisting essentially of carbon atoms. The backbone is preferably saturated. Pendent from the backbone are one or more said functional groups described. Said polymer may have a number average molecular weight (Mn) of at least 10,000, preferably at least 50,000, especially at least 75,000. Mn may be less than 500,000, preferably less than 400,000. Said second polymeric material is preferably a polyvinyl polymer. Preferred second polymeric compounds include optionally substituted, preferably unsubstituted, polyvinylalcohol, polyvinylacetate, polyalkylene glycols, for example polypropylene glycol, and collagen (and any component thereof) and of these polyvinylalcohol and/or polyvinylacetate based polymeric materials are preferred.

In one embodiment, preferred second polymeric materials comprise a polymeric material AA which includes —O— moieties pendent from a polymeric backbone thereof. Said polymeric backbone of polymeric material AA preferably includes carbon atoms. Said carbon atoms are preferably part of —$CH_2$— moieties. Preferably, a repeat unit of said polymeric backbone includes carbon to carbon bonds, preferably C—C single bonds. Preferably, said polymeric material AA includes a repeat unit which includes a —$CH_2$— moiety. Preferably, said polymeric backbone does not include any —O— moieties, for example —C—O— moieties such as are found in an alkyleneoxy polymer, such as polyethyleneglycol. Said polymeric backbone is preferably not defined by an aromatic moiety such as a phenyl moiety such as is found in polyethersulphones. Said polymeric backbone preferably does not include any —S— moieties. Said polymeric backbone preferably does not include any nitrogen atoms. Said polymeric backbone preferably consists essentially of carbon atoms, preferably in the form of C—C single bonds. Said —O— moieties are preferably directly bonded to the polymeric backbone. Said polymeric material AA preferably includes, on average, at least 10, more preferably at least 50, —O— moieties pendent from the polymeric backbone thereof. Said —O— moieties are preferably a part of a repeat unit of said polymeric material AA. Preferably, said —O— moieties are directly bonded to a carbon atom in said polymeric backbone of polymeric material AA, suitably so that said polymeric material AA includes a moiety (which is preferably part of a repeat unit) of formula:

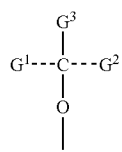

IV where $G^1$ and $G^2$ are other parts of the polymeric backbone and $G^3$ is another moiety pendent from the polymeric backbone. Preferably, $G^3$ represents a hydrogen atom.

Preferably, said polymeric material AA includes a moiety

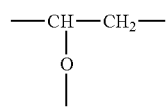

V

Said moiety V is preferably part of a repeat unit. Said moiety V may be part of a copolymer which includes a repeat unit which includes a moiety of a different type compared to moiety V. Suitably, at least 60 mole %, preferably at least 80 mole %, more preferably at least 90 mole % of polymeric material AA comprises repeat units which comprise (preferably consists of) moieties V. Preferably, said polymeric material AA consists essentially of repeat units which comprise (preferably consist of) moieties V.

Suitably, 60 mole %, preferably 80 mole %, more preferably 90 mole %, especially substantially all of said polymeric material AA comprises vinyl moieties which are optionally cross-linked.

Preferably, the free bond to the oxygen atom in the —O— moiety pendent from the polymeric backbone of polymeric material AA (and preferably also in moieties IV and V) is bonded to a group $R^{10}$ (so that the moiety pendent from the polymeric backbone of polymeric material AA is of formula —O—$R^{10}$). Preferably group $R^{10}$ comprises fewer than 10, more preferably fewer than 5, especially 3 or fewer carbon atoms. It preferably only includes atoms selected from carbon, hydrogen and oxygen atoms. $R^{10}$ is preferably selected from a hydrogen atom and an alkylcarbonyl, especially a methylcarbonyl group. Preferably moiety —O— $R^{10}$ in said polymeric material AA is an hydroxyl or acetate group.

Said polymeric material AA may include a plurality, preferably a multiplicity, of functional groups (which incorporate the —O— moieties described) selected from hydroxyl and acetate groups. Said polymeric material AA preferably includes a multiplicity of hydroxyl groups pendent from said polymeric backbone. Said polymeric material AA preferably includes a multiplicity of acetate groups pendent from the polymeric backbone.

Preferably, each free bond to the oxygen atoms in —O— moieties pendent from the polymeric backbone in polymeric material AA, except for any free bonds which are involved in cross-linking the polymeric material AA, is of formula —O—$R^{10}$ wherein each group —$OR^{10}$ is selected from hydroxyl and acetate.

Preferably, said polymeric material AA includes a vinyl alcohol moiety, especially a vinyl alcohol repeat unit. Said polymeric material AA preferably includes a vinyl acetate moiety, especially a vinylacetate repeat unit. Polyvinylalcohol is generally made by hydrolysis of polyvinylacetate. Said polymeric material AA may comprise a 0-100% hydrolysed, preferably a 5 to 95% hydrolysed, more preferably a 60 to 90 wt %, especially a 70 to 85 wt % hydrolysed polyvinylacetate Said polymeric material AA may have a number average molecular weight (Mn) of at least 10,000, preferably at least 50,000, especially at least 75,000. Mn may be less than 500,000, preferably less than 400,000. Said polymeric material AA is preferably a polyvinyl polymer. Said polymeric material AA may be a copolymer.

Said polymeric material AA is preferably a polyvinyl alcohol polymer or copolymer.

Said polymeric material AA may be a random or block copolymer.

Said third polymeric material may be prepared from two different types of second polymeric materials suitably selected from those described above.

Where two types of second polymeric materials are used, preferably both are polyvinyl polymers and more preferably both are polyvinylalcohol polymers. The two types may have different number average molecular weight. One of the polymers may have a number average molecular weight which is at least 1.5, preferably at least 2, more preferably at least 2.5 times the molecular weight of the other.

Preferably, said second polymeric material includes at least one vinyl alcohol/vinyl acetate copolymer which may include greater than 5 wt %, suitably greater than 30 wt %, preferably greater than 50%, more preferably greater than 65%, especially greater than 80 wt % of vinyl alcohol moieties. Where two types of second polymeric material are provided both may be vinyl alcohol/vinyl acetate copolymers of the type described. Preferably, said copolymers are substantially identical except for differences in their number average molecular weights. The provision of two types of second polymeric materials of different properties (e.g. number average molecular weight) provides a means whereby the viscosity of a formulation of the first and second materials before reaction to form the third polymeric material may be adjusted.

According to a third aspect of the invention, there is provided a method of reducing the production of water from an oil-producing subterranean formulation, said method comprising contacting the formation with a restrictor formulation which has a density between the densities of the oil and water (e.g. sea water) in the subterranean formation, wherein the viscosity of the restrictor formulation increases subsequent to contact with said formation.

Suitably, the density of said restrictor formulation, measured at 20° C., is less than 1 g.cm$^{-3}$, preferably less than 0.99 g.cm$^{-3}$, more preferably less than 0.98 g.cm$^{-3}$. Said density of said restrictor formulation measured at 20° C. is suitably greater than 0.80 g.cm$^{-3}$, preferably greater than 0.85 g.cm$^{-3}$, more preferably greater than 0.90 g.cm$^{-3}$, especially greater than 0.93 g.cm$^{-3}$.

Suitably, after initial contact with the subterranean formation, the restrictor formulation can flow within the formation. After a period of time its viscosity may increase so it is restricted from flowing within the formation and is then able to provide a barrier to restrict passage of a fluid (e.g. water) between a first location and a second location.

The viscosity (suitably measured at 100 s$^{-1}$) of the restrictor formulation immediately prior to contact with the formation (e.g. when the formulation is at an outlet of an injection means) may be less than 100 cP, suitably less than 50 cP, for example as described above. After injection, the ratio of the viscosity (suitably measured at 100 s$^{-1}$) of the restrictor formulation within the formation to the viscosity immediately prior may be at least 1.1, preferably at least 1.5, more preferably at least 2

The viscosity of the restrictor formulation preferably increases due to a chemical reaction, for example covalent bond formation, within the formation. The formulation suitably becomes a solid-like elastic gel.

Said restrictor formulation preferably comprises a first material as described above and a second polymeric material as described above. Preferably, the viscosity of the restrictor formulation increases due to the formation of a said third polymeric material by reaction involving said first material and said second polymeric material.

Said third polymeric material is preferably a hydrogel.

Said restrictor formulation preferably includes a density adjustment means for adjusting the density thereof so that it is intermediate the densities of oil and water in said subterranean formation. Said density adjustment means may have a density of less than 0.95 g.cm$^{-3}$, preferably less than 0.90 g.cm$^{-3}$. The density may be greater than 0.7 g.cm$^{-3}$, preferably greater than 0.75 g.cm$^{-3}$, especially greater than 0.80 g.cm$^{-3}$.

Said density adjustment means is preferably hydrophobic. It is preferably substantially immiscible with water.

Said density adjustment means may have any feature of said "additional component" referred to above. It preferably comprises a hydrocarbon or hydrocarbon mixture and, especially, is diesel fuel (or comprises one or a plurality of components thereof).

According to a fourth aspect of the invention, there is provided a subterranean formation comprising a first location and a second location, wherein a third polymeric material is arranged between the first and second locations for restricting passage of a fluid (e.g. water) between the locations.

According to a fifth aspect of the invention, there is provided a subterranean formation comprising a region having relatively poor natural water conformance and/or relatively high natural water coning, wherein said region is plugged with a third polymeric material as described herein.

By "natural" we mean prior to human intervention with means directed at addressing poor conformance or water coning problems.

It is believed that certain examples of restrictor formulations described herein are novel. Accordingly, in a sixth aspect, there is provided a restrictor formulation comprising:

(a) a first material as described herein;
(b) a second polymeric material as described herein; and
(c) an additional component as described herein.

Preferably, said restrictor formulation includes less than 40 wt %, more preferably less than 30 wt %, especially less than 20 wt % of said additional component. Said additional component preferably comprises a hydrocarbon and may be diesel oil.

The invention extends to a receptacle containing at least 10 litres, preferably at least 100 litres, of a restrictor formulation as described herein.

As described herein, inclusion of an additional component such as diesel fuel in a polymeric material may increase its strength. Accordingly, the invention extends to a method of forming a polymeric material, (herein a third polymeric material), the method comprising encapsulating in said third polymeric material droplets of a strength adjustment means.

The method preferably comprises incorporating said droplets when in liquid form into said third polymeric material.

The method may comprise selection of a first material, a second polymeric material, water and an additional component arranged to provide said droplets; and allowing the reaction of said first material and said second polymeric material to form said third polymeric material such that the additional component is encapsulated as droplets in the third polymeric material.

Said third polymeric material is preferably a hydrogel which encapsulates droplets of said strength adjustment means in liquid form. Said strength adjustment means preferably has a freezing point of less than 10° C., preferably less than 0° C.

Said strength adjustment means may have any feature of said "additional component" and/or of said "density adjustment means" described herein.

The invention extends to a third polymeric material as described herein which encapsulates droplets of a strength adjustment means as described herein. Said third polymeric material preferably encapsulates water; and preferably is a hydrogel.

Any feature of any aspect of any invention or embodiment described herein may be combined with any feature of any aspect of any other invention or embodiment described herein mutatis mutandis.

Specific embodiments of the invention will now be described, by way of example.

The following terms are used hereinafter:

"pbw"—means "parts by weight"

diesel fuel—this refers to diesel fuel in the absence of surfactant additives present in commercial diesel.

In general terms, water control/conformance may be improved and/or water coning reduced in a subterranean hydrocarbon-bearing formation by forming a gel in or adjacent to a high permeability zone of a subterranean formation wherein it is desired to reduce permeability of the formation and therefore restrict the passage of water.

The gel is formed from a gel precursor formulation which suitably comprises poly (vinyl alcohol), a cross-linker therefor, clean diesel fuel or kerosene and an acid catalyst. The gel precursor formulation may be prepared on the surface. The amounts/identity of the components may be varied to vary the time for the formulation to gel. The formulation is initially of relatively low viscosity (suitably less than 50 cP). It can readily be injected into a desired location within a subterranean formation and may seek out a water-oil interface. During its passage into the subterranean formation and subsequent thereto the precursor formulation gels as the cross-linker and the poly(vinyl alcohol) react. The gel, once formed, reduces the permeability of the formation and may therefore improve water conformance and/or reduce water coning.

EXAMPLE 1

Preparation of poly (1,4-di(4-(N-methylpyridinyl))-2,3-di (4-(1-formylphenyl)butylidene This was prepared as described in Example 1 of PCT/GB97/02529, the contents of which are incorporated herein by reference. In the method, an aqueous solution of greater than 1 wt % of 4-(4-formylphenylethenyl)-1-methylpyridinium methosulphonate (SbQ) is prepared by mixing the SbQ with water at ambient temperature. Under such conditions, the SbQ molecules form aggregates. The solution was then exposed to ultraviolet light. This results in a photochemical reaction between the carbon-carbon double bonds of adjacent 4-(4-formylphenylethenyl)-1-methylpyridinium methosulphate molecules (I) in the aggregate, producing a polymer, poly (1,4-di(4-(N-methylpyridinyl))-2,3-di (4-(1-formylphenyl)butylidene methosulphonate.

EXAMPLE 2

A formulation for use in reducing water conformance was prepared as follows:

Water (95.5 pbw) at ambient temperature (about 25° C.) was stirred at a low rate (to prevent foaming) and a vinylalcohol/vinylacetate copolymer (containing 88% alcohol and 12% acetate units) (4.5 pbw) and the butylidene polymer of Example 1 (0.4 pbw) were added and stirring continued without a pause. After dissolution of copolymer and the butylidene polymer, diesel fuel (10 pbw) was added with continuous stirring so that it became emulsified. Then, paratoluene sulphonic acid (PTSA) was added and thoroughly mixed into the formulation. This formulation had a viscosity of 2-5 cP.

After addition of the acid, the gelling reaction starts. However, the formulation described takes about 4.5 hours at 25° C. to produce a solid gel.

The gelling reaction is summarised below:

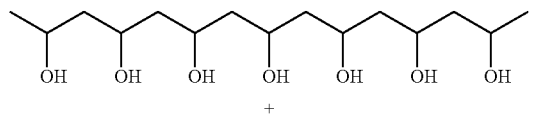

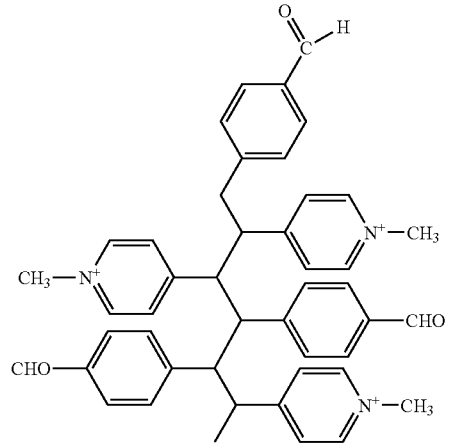

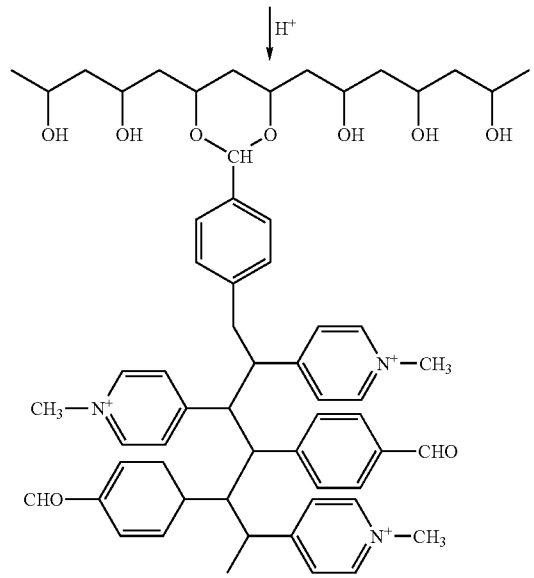

A formulation as described in Example 2 has been used to reduce water coning. In use, the formulation is injected to a desired subterranean location. Advantageously, since the formulation includes a substantial amount of water, it has a tendency to be attracted to water. Furthermore, the density of the gel is less than water which means that it has a tendency to migrate to an oil-water interface which may improve its efficacy. Use of the formulation described has been found to reduce water coning significantly and thereby allow increased oil production.

The amounts and/or identity of the components of the formulation of Example 2 may be varied to affect the formation and properties of the gel, as follows:

(a) Butylidene polymer—increasing the concentration of the polymer used tends to shorten the time for the formulation to form a gel. It is preferred to use a butylidene polymer concentration of 10 wt % or less of the amount of polyvinylalcohol in the formulation since higher butylidene polymer concentrations tend to make the gel formed brittle.

(b) Polyvinylalcohol—the concentration affects the time for the formulation to form a gel and the final gel strength. The formulation preferably has a total polyvinylalcohol concentration of 5 wt % or less. If the concentration of polyvinylalcohol in the formulation is too high, the gel tends to form too quickly.

Additionally, the molecular weight of the poly(vinylalcohol) copolymer affects the initial viscosity of the formulation. For example if only a single type of 88% hydrolysed poly (vinylalcohol) which has a relatively low molecular weight (e.g. about 100,000) is used, then the initial viscosity of the formulation prepared may be relatively low. However, if a high molecular weight material is used (e.g. of greater than 300,000) the initial viscosity of the formulation will be higher. By selection of one of more polyvinylalcohols or appropriate molecular weight, the viscosity of the formulation may be varied over a wide range.

(c) Diesel fuel—The diesel fuel suitably does not include any additives since such additives can affect gel formation. Consequently, vehicle diesel fuel is preferably not used. The amount of diesel fuel affects the density and strength of the gel. The greater the amount of diesel fuel, the lower the density of the gel which forms and, consequently, the gel has an increased buoyancy which may facilitate its passage to a subterranean oil-water interface. Additionally, increasing the amount of diesel fuel increases the water repellency of the gel which may facilitate its action in reducing coning (and the like). Additionally, increasing the amount of diesel fuel increases the strength of the gel and the gel has a reduced tendency to rupture. It may be that the gel strength is improved by the diesel fuel in a manner akin to the increased strength of rubber when it contains glass beads. As described above, the diesel fuel is emulsified and is present as small droplets in the formulation and in the gel formed therefrom. The droplets may act in a manner similar to the glass beads.

As an alternative to diesel fuel, other organic non-polar materials which suitably are less dense than water may be used such as oils, including vegetable oils and kerosene.

The amount of diesel fuel (or an alternative therefor) may represent up to 50 wt % of the formulation with the range about 10-20 wt % being preferred (d) Catalyst—This catalyses the reaction of the butylidene polymer and polyvinylalcohol. The amount and identify of the catalyst has consequences for gel strength and the time for the formulation to the gel. In general, increasing the amount of acid tends to increase the rate of formation of the gel; however, the gel may have reduced strength. Mineral acids such as hydrochloric acid may be used and these result in a relatively quick rate of production of gel, compared to PTSA which leads to a slower gelation reaction. In general the lower the pH of the formulation, the quicker the gelation reaction.

In addition, the formation and properties of the gel may be affected by the temperature and pressure during the gelation reaction. In general, increasing either of these parameters increases the rate of formation of the gel.

Advantageously, if the formulation and/or the gel formed therefrom are misplaced or otherwise need to be removed, a formulation comprising a periodate (e.g. sodium or potassium periodate) in water, suitably sea water, may be prepared at a concentration up to the saturated solubility limit of the periodate in water. The periodate formulation may then be contacted with the gel-forming formulation described or with the gel formed therefrom. The periodate causes cleavage of 1,2-diol linkages of the moiety in the gel derived from polyvinylalcohol and consequently the viscosity of the gel forming formulation and/or the gel is reduced, facilitating its removal.

As an alternative to the use of the butylidene polymer for cross-linking poly(vinylalcohol) (or any other relevant polymer), other aldehyde group containing cross-linkers may be used such as glutaraldehyde or glyoxal.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of restricting passage of a fluid from a first location to a second location, the method comprising:
   (a) selecting a first material wherein said first material has a general formula OHC-$G^5$-CHO wherein $G^5$ includes both an aromatic group and a N-containing heteroaromatic group;
   (b) selecting a second polymeric material which includes a functional group which is able to react in the presence of said first material to form a third polymeric material;
   (c) causing the formation of said third polymeric material by a reaction involving said first material and said second polymeric material, wherein said third polymeric material contains about 40 wt % to about 90 wt % water; and
   (d) arranging said third polymeric material between said first and second locations.

2. A method according to claim 1, which comprises restricting the passage of a fluid between two subterranean locations.

3. A method according to claim 1, wherein said first material and said second polymeric material are included in a restrictor formulation.

4. A method of restricting passage of a fluid from a first location to a second location, the method comprising positioning a third polymeric material between said first and second locations, wherein said third polymeric material is a product of a reaction involving:
   (a) a first material wherein said first material has a general formula OHC-$G^5$-CHO wherein $G^5$ includes both an aromatic group and a N-containing heteroaromatic group; and
   (b) a second polymeric material which includes a functional group which is able to react in the presence of said first material to form said third polymeric material.

5. A method of reducing the production of water from a water and oil producing subterranean formation which comprises contacting the formation with:
   (a) a restrictor formulation which comprises a first material and a second polymeric material, wherein said first material has a general formula OHC-$G^5$-CHO wherein $G^5$ includes both an aromatic group and a N-containing heteroaromatic group and wherein said second polymeric material includes a functional group which is able to react in the presence of said first material to form a third polymeric material; and/or (b) a third polymeric material formed by reaction involving said first material and second polymeric material.

6. A method according to claim 5, which includes injecting a said restrictor formulation into a subterranean formation and causing it to move to a desired location in which it may restrict passage of fluid from a first location to a second location.

7. A method according to claim 6, wherein the viscosity of the restrictor formulation immediately prior to injection into a subterranean formation is less than 100 cp.

8. A method according to claim 5, wherein said restrictor formulation has a density at 25° C. which is less than the density of pure water.

9. A method according to claim 5, wherein the ratio of the wt % of said first material to the wt % of said second polymeric material in said restrictor formulation is less than 0.15.

10. A method according to claim 9, wherein the sum of the wt % of the first material and said second polymeric material in said restrictor formulation is at least 2 wt % and is less than 15 wt %.

11. A method according to claim 10, wherein said restrictor formulation includes at least 40 wt % and less than 90 wt % of water.

12. A method according to claim 5, wherein said restrictor formulation includes an additional component which is substantially immiscible with pure water at 25° C.

13. A method according to claim 12, wherein said additional component has a boiling point of greater than 110° C.

14. A method according to claim 12, wherein said additional component is a hydrocarbon or an oil.

15. A method according to claim 5, wherein the restrictor formulation includes a catalyst for catalysing the reaction of the first material and said second polymeric material.

16. A method according to claim 5, wherein a said restrictor formulation comprising said first material and said second polymeric material and, optionally, an additional component and a said catalyst, is prepared at the surface and then injected into the subterranean formation.

17. A method according to claim 5, wherein said first material is selected from an aldehyde, carboxylic acid, urea, acroleine, isocyanate, vinyl sulphate or vinyl chloride of a diacid.

18. A method according to claim 5, wherein $G^5$ includes an $N^+$ moiety.

19. A method according to claim 5, wherein said first material comprises:

(i) a first polymeric material having a repeat unit of formula

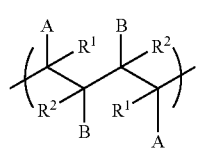

I wherein each A and B is independently selected from optionally-substituted aromatic and heteroaromatic groups and at least one comprises a relatively polar atom or group and $R^1$ and $R^2$ independently comprise relatively non-polar atoms or groups with at least one A being an aromatic group and at least one B being a heteroaromatic group; or (ii) a first polymeric material prepared or preparable by providing a compound of general formula

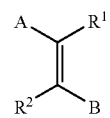

wherein A, B, $R^1$ and $R^2$ are as described above, in an aqueous solvent and causing the groups C=C in said compound to react with one another to form said first polymeric material.

20. A method according to claim 19, wherein $R^1$ and $R^2$ represent hydrogen atoms; and one of groups A and B includes a substituent which includes a carbonyl or acetal group.

21. A method according to claim 19, wherein said second polymeric material includes a functional group selected from an alcohol, carboxylic acid, carboxylic acid derivative, and an amine group.

22. A method according to claim 19, wherein said second polymeric material comprises a polymeric material AA which includes a polymeric backbone which includes carbon atoms and —O— moieties pendent from the polymeric backbone.

23. A method according to claim 22, wherein said polymeric material AA includes a repeat unit of formula

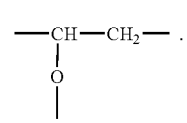

V

24. A method according to claim 22, wherein said polymeric material AA includes a vinyl alcohol repeat unit and a vinyl acetate repeat unit.

25. A method of plugging at least one relatively high permeability region bounded by at least one relatively low permeability region in a hydrocarbon bearing subterranean formation, said formation being penetrated by a well bore, the method comprising contacting said at least one relatively high permeability region with a restrictor formulation which comprises a first material and a second polymeric material, wherein said first material has a general formula OHC-$G^5$-CHO wherein $G^5$ includes both an aromatic group and a N-containing heteroaromatic group and wherein said second polymeric material includes a functional group which is able to react in the presence of said first material to form a third polymeric material; and/or said restrictor formulation comprises a third polymeric material formed by reaction involving said first material and second polymeric material.

26. A method of reducing the production of water from an oil-producing subterranean formation, said method comprising contacting the formation with a restrictor formulation which has a density between the densities of the oil and water in the subterranean formation, wherein the viscosity of the restrictor formulation increases subsequent to contact with said formation, wherein said restrictor formulation includes a density adjustment additive which is capable of adjusting the density of the restrictor formulation so that it is intermediate the densities of oil and water in the subterranean formation and wherein said density adjustment additive has a density of greater than 0.80g.cm$^{-3}$ and less than 0.95g.cm$^{-3}$.

27. A subterranean formation comprising a first location and a second location, wherein a third polymeric material is arranged between the first and second locations for restricting passage of a fluid between the locations, wherein said third polymeric material is formed by reaction involving a first material and a second polymeric material, wherein said first material has a general formula OHC-G$^5$-CHO wherein G$^5$ includes both an aromatic group and a N-containing heteroaromatic group, and wherein said second polymeric material includes a functional group which is able to react in the presence of said first material to form said third polymeric material.

28. A subterranean formation comprising a region having relatively poor natural water conformance and/or relatively high natural water coning, wherein said region is plugged with a third polymeric material; wherein said third polymeric material is formed by reaction involving a first material and a second polymeric material, wherein said first material has a general formula OHC-G$^5$-CHO wherein G$^5$ includes both an aromatic group and a N-containing heteroaromatic group, and wherein said second polymeric material includes a functional group which is able to react in the presence of said first material to form said third polymeric material.

29. A restrictor formulation comprising:
  (a) a first material;
  (b) a second polymeric material which includes a functional group which is able to react in the presence of said first material to form a third polymeric material; and
  (c) an additional component for adjusting the density of the restrictor formulation, said additional component having a density of greater than 0.80 g/m$^3$ and less than 0.95 g/cm$^3$.

30. A receptacle containing at least 10 litres of a restrictor formulation as claimed in claim 29.

31. A method of forming a polymeric material which encapsulates droplets of a strength adjustment additive in the polymeric material, the method comprising providing a first material, a second polymeric material, water and a strength adjustment additive; and allowing the reaction of said first material and said second polymeric material to form a third polymeric material under conditions such that the strength adjustment additive is encapsulated as droplets in the third polymeric material.

32. A method of reducing the production of water from a water and oil producing subterranean formation which comprises contacting the formation with:
  (a) a restrictor formulation which comprises a first material and a second polymeric material which includes a functional group which is able to react in the presence of said first material to form a third polymeric material; and/or
  (b) a third polymeric material; wherein the method includes injecting said restrictor formulation into said subterranean formation and causing it to move to a desired location in which it restricts passage of fluid from a first location to a second location;
  wherein the viscosity of the restrictor formulation immediately prior to injection into said subterranean formation is less than 100 cp.

33. A method of reducing the production of water from a water and oil producing subterranean formation which comprises contacting the formation with:
  (a) a restrictor formulation which comprises a first material and a second polymeric material which includes a functional group which is able to react in the presence of said first material to form a third polymeric material; and/or
  (b) a third polymeric material;
  wherein the method includes injecting said restrictor formulation into said subterranean formation and causing it to move to a desired location in which it restricts passage of fluid from a first location to a second location;
  wherein said restrictor formulation has a density at 25° C. which is less than the density of pure water.

* * * * *